US009058230B1

(12) United States Patent
van Rietschote et al.

(10) Patent No.: US 9,058,230 B1
(45) Date of Patent: Jun. 16, 2015

(54) ONLINE EXPERT SYSTEM GUIDED APPLICATION INSTALLATION

(75) Inventors: Hans Frederik van Rietschote, Sunnyvale, CA (US); James Cabell Poole, Oviedo, FL (US)

(73) Assignee: Symantec Operating Corporation, Mountain View, CA (US)

( * ) Notice: Subject to any disclaimer, the term of this patent is extended or adjusted under 35 U.S.C. 154(b) by 1413 days.

(21) Appl. No.: 12/127,373

(22) Filed: May 27, 2008

(51) Int. Cl.
G06F 9/445 (2006.01)
G06F 11/10 (2006.01)

(52) U.S. Cl.
CPC ............. *G06F 8/61* (2013.01); *G06F 11/1048* (2013.01)

(58) Field of Classification Search
CPC ............... G06F 8/60; G06F 8/61; G06F 8/63; G06F 11/00; G06F 11/1048; G06F 2011/00; G06F 2201/00
USPC ............... 717/101–178; 703/1; 709/201–203, 709/218–221, 224; 713/191; 714/26, 40, 714/46; 726/3
See application file for complete search history.

(56) References Cited

U.S. PATENT DOCUMENTS

| | | | | |
|---|---|---|---|---|
| 6,021,437 | A * | 2/2000 | Chen et al. | 709/224 |
| 6,324,690 | B1 * | 11/2001 | Luu | 717/177 |
| 6,367,035 | B1 * | 4/2002 | White | 714/40 |
| 6,629,267 | B1 * | 9/2003 | Glerum et al. | 714/38.11 |
| 6,934,956 | B1 * | 8/2005 | Allen | 719/327 |
| 7,072,807 | B2 * | 7/2006 | Brown et al. | 703/1 |
| 7,721,158 | B2 * | 5/2010 | Lee | 714/48 |
| 7,913,249 | B1 * | 3/2011 | MacIntyre et al. | 717/174 |
| 2003/0037327 | A1 * | 2/2003 | Cicciarelli et al. | 717/178 |
| 2003/0051235 | A1 * | 3/2003 | Simpson | 717/174 |
| 2003/0149889 | A1 * | 8/2003 | Wookey et al. | 713/200 |
| 2003/0208685 | A1 * | 11/2003 | Abdel-Rahman | 713/191 |
| 2003/0226138 | A1 * | 12/2003 | Luu | 717/175 |
| 2004/0024849 | A1 * | 2/2004 | El-Beik | 709/219 |
| 2004/0031032 | A1 * | 2/2004 | Clough et al. | 717/177 |
| 2004/0128583 | A1 * | 7/2004 | Iulo et al. | 714/25 |
| 2004/0237068 | A1 * | 11/2004 | Ren | 717/110 |

(Continued)

OTHER PUBLICATIONS

Definition and Validation of the Key process of Release, Delivery and Deployment for Product Software Vendors: turning the ugly duckling into a swan—Slinger Jansen, Sjaak Brinkkemper—Information and Computing Sciences Institute Utrecht University, Utrecht, The Netherlands—22nd IEEE International Conference on Software Maintenance—2006.*

*Primary Examiner* — Lewis A Bullock, Jr.
*Assistant Examiner* — Francisco Aponte
(74) *Attorney, Agent, or Firm* — Campbell Stephenson LLP

(57) ABSTRACT

An online expert system that can communicate software installation instructions to a remote node through the use of a generic installer executing on the remote node is provided. Embodiments of the online expert system can identify a set of installation instructions configured to install a software product on the remote node, execute the set of installation instructions, record results of the execution of the installation instructions, and, if an error is detected in the results, submit the results for analysis to determine whether a solution to the error is available and execute the solution, if any. Aspects of the online expert system provide for the executing of the installation instructions to include communicating installation-related information to the remote node over a network. Further aspects of the online expert system provide for executing a solution to an error to include communicating solution-related information to the remote node over the network.

24 Claims, 5 Drawing Sheets

(56) References Cited

U.S. PATENT DOCUMENTS

| | | | |
|---|---|---|---|
| 2005/0160420 A1* | 7/2005 | Kruta et al. | 717/174 |
| 2005/0216300 A1* | 9/2005 | Appelman et al. | 705/1 |
| 2005/0257214 A1* | 11/2005 | Moshir et al. | 717/171 |
| 2005/0262495 A1* | 11/2005 | Fung et al. | 717/170 |
| 2006/0048136 A1* | 3/2006 | Vries et al. | 717/174 |
| 2006/0271341 A1* | 11/2006 | Brown et al. | 703/1 |
| 2008/0005735 A1* | 1/2008 | Curtis | 717/174 |
| 2008/0201707 A1* | 8/2008 | Lavery et al. | 717/178 |
| 2008/0222199 A1* | 9/2008 | Tiu et al. | 707/104.1 |

\* cited by examiner

ONLINE EXPERT SYSTEM GUIDED APPLICATION INSTALLATION

FIELD OF THE INVENTION

The present invention relates to the field of computer software installation, and particularly to a system and method for performing software installations from a centralized online expert system that provides product installation instructions, fixes for any errors that occur during software installation or subsequent testing.

BACKGROUND OF THE INVENTION

Computers, both those used in the home and those used by businesses, find much of their utility based in the software that is executed upon those computers. In many case, the first experience that a computer user or system administrator has with software is during the process of installing the software on a computer. It is often said that the first impression is the most important and this holds true as much in a software context as in any other.

Since installation is often the first encounter a customer has with a product, any negative experience can be detrimental to the quality associated with that product by the customer. For example, if a customer is evaluating software and cannot get the product installed, it is likely that the customer will not purchase the software later. Such installation problems may often go undetected by those responsible for creating installation methods for software (e.g., software engineers) because there has been no reliable method for providing information as to such failures. In the past, often sales or technical support has had to rely upon customer experiential information rather than hard data related to an installation failure.

Another issue presented to customers experiencing software installation failure has been an inability for the customer to automatically receive help, either in the form of a fix for the problem or links to advice for solving the problem or even communication from a technical support agent. It is therefore desirable to have a mechanism by which data related to a software installation failure is provided to members of the entity distributing the software, as well as a mechanism for automatically providing a solution or at least information related to the problem automatically to the customer.

In order to avoid delays in propagating fixes to installation-related failures, it is also desirable to have a mechanism by which propagation of solutions can be rapidly provided. It is further desirable to have a mechanism by which a newly-discovered installation-related failure can be rapidly remedied by providing an avenue for technical support agents to interact with a software installation that is currently in a failure mode.

SUMMARY OF THE INVENTION

Embodiments of the present invention provide an online expert system that can communicate software installation instructions to a remote node through the use of a generic installer executing on the remote node. Embodiments of the online expert system can identify a set of installation instructions configured to install a software product on the remote node, execute the set of installation instructions, record results of the execution of the installation instructions, and, if an error is detected in the results, submit the results for analysis to determine whether a solution to the error is available and execute the solution, if any. Aspects of the online expert system provide for the executing of the installation instructions to include communicating installation-related information to the remote node over a network. Further aspects of the online expert system provide for executing a solution to an error to include communicating solution-related information to the remote node over the network.

Another aspect of the above embodiments of the online expert system includes receiving from the remote node an identification of the software product to install and, in response to receiving this identification, requesting configuration information about the configuration of the remote node. A further aspect of the above embodiments of the online expert system includes identifying the set of installation instructions using the identification of the software product and the remote node's configuration information. An additional aspect of the above embodiments of the online expert system is that the communicating is performed via an application programming interface installed on the remote node.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide an online expert system that can communicate software installation instructions to a remote node through the use of a generic installer executing on the remote node. Once the remote node requests to install a specified product, the expert system can instruct the generic installer to gather configuration information about the remote node and provide that information to the expert system. Based upon the product identification and the configuration information of the remote node, the expert system can then select an appropriate set of instructions for installing the specified product on the remote node and then communicate the necessary instructions and files to the remote node for installing the software. Further embodiments of the present invention can respond to errors occurring in the installation of the software on the remote node by automatically searching a database of reported errors and their solutions and providing a found solution to the encountered error. In the event that a solution to an installation error is not found, embodiments of the present invention can contact a technical support agent who can provide instructions to the remote node to overcome the installation-related errors. Embodiments of the present invention can further maintain logs and other files related to all software installations performed by the expert system in order to provide detailed feedback to technical support agents who can use this information to improve installation processing. Further embodiments of the invention can also track software user licenses and report on installations performed by the expert system.

Embodiments of the present invention can be used to overcome a variety of installation-related issues associated with current methods of software installation. For example, in current software application installations, all possible situations should be accounted for in the installer logic. Once the installer is shipped to a customer, discovered bugs that can cause installation failures are difficult to impossible to remedy. In many such cases, the customer must manually get new install media containing fixes for the problem or download a new version of the installer. In addition, when many current installers encounter an error that prevents installation, they will just provide the user an error message or a means to contact technical support, which effectively leaves the customer to fend for themselves. Current installers do not centrally track information about installations (e.g., log files) so it is difficult to collect data on the quality of installers being shipped to customers. Embodiments of the present invention address all of these shortcomings of current installers.

Figure 1:
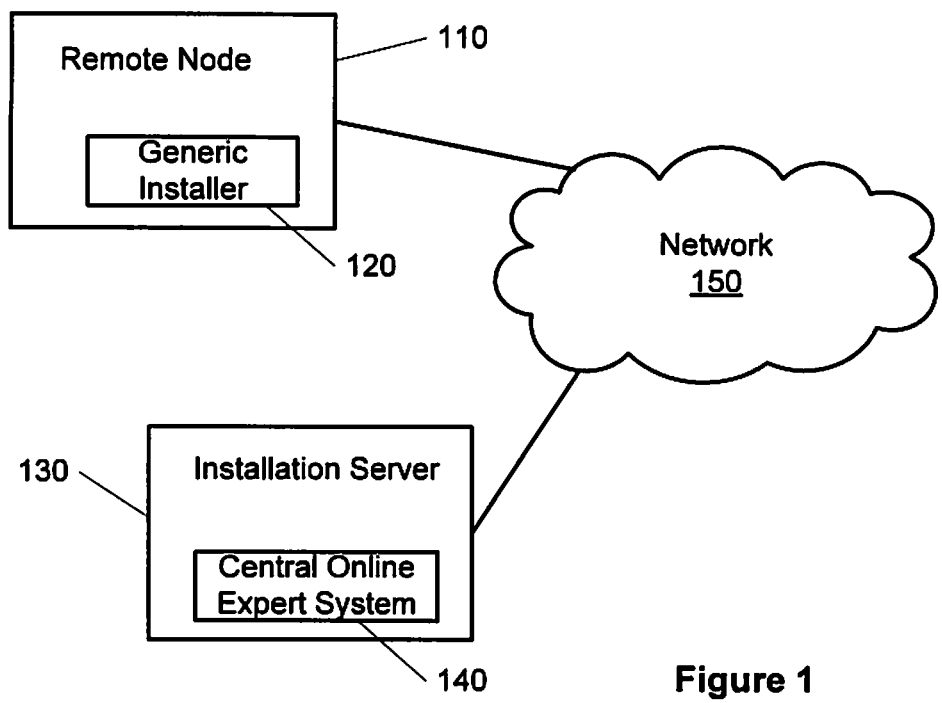
FIG. 1 is a simplified block diagram illustrating network-connected nodes that are configured to implement embodiments of the present invention.

FIG. 1 is a simplified block diagram illustrating network-connected nodes that are configured to implement embodiments of the present invention. FIG. 1 provides a remote node 110 coupled to an installation server 130 via a network 150. Remote node 110 is a computing node (e.g., a desktop computer, a laptop computer, a workstation, a server, and the like) on which one or more software products are to be installed. In order to effect the installation of these products, embodiments of the present invention provide a generic installer 120 to execute on remote node 110. As will be discussed in more detail below, generic installer 120 provides a mechanism by which remote node 110 can receive installation-related instructions from installation server 130. In embodiments of the present invention, installation server 130 provides a central online expert system 140 that can respond to installation-related requests and perform the tasks related to providing installation-related information and instructions to remote node 110 via generic installer 120. Embodiments of central online expert system 140 will be discussed in more detail below.

Remote node 110 is coupled to installation server 130 via a network 150. Embodiments of the present invention are agnostic to the nature of network 150 and only require that network 150 provide a means of communication between remote node 110 and installation server 130. Network 150 can, for example, be a local area network, a metro area network, a wide area network, or any combination thereof.

Figure 2:
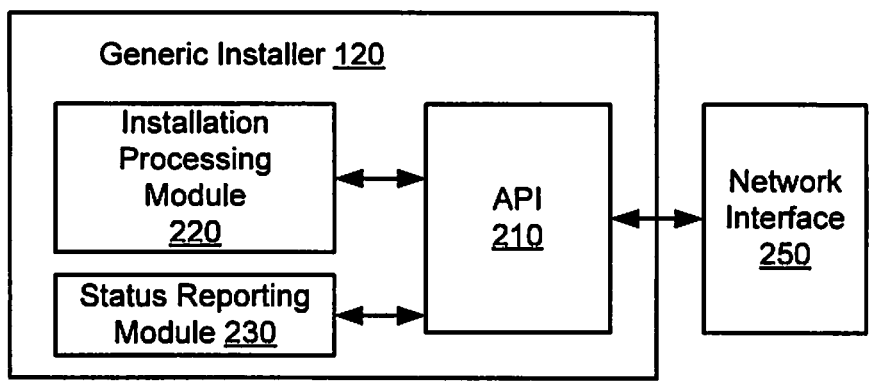
FIG. 2 is a simplified block diagram of a generic installer 120 usable for implementing embodiments of the present invention.

FIG. 2 is a simplified block diagram of a generic installer 120 usable for implementing embodiments of the present invention. As discussed above, embodiments of the present invention are configured to use a simple installer on the remote node, while providing the bulk of the decision-making processing on the installation server using the central online expert system. One configuration of generic installer 120 usable by embodiments of the present invention is an installation language interpreter configured to parse and execute installation-related commands provided by central online expert system 140 on remote node 110. Subsequently, the generic installer can transmit results of executing the installation-related commands to the central online expert system.

Thus, generic installer 120 is used to primarily provide a mechanism by which the central online expert system 140 can provide installation-related instructions to remote node 110 and receive information regarding the progress of an installation from remote node 110. In order to provide a mechanism by which such information can be exchanged, embodiments of generic installer 120 provide an application programming interface 210 (API), coupled to a network interface 250, that allows the central online expert system to provide instructions to remote node 110. In this manner, the central online expert system can always use a common set of instructions for any node that is performing an install, regardless of the nature of that node (e.g., processor, operating system type and operating system version).

Generic installer 120 can further provide an installation processing module 220 that is coupled to API 210. Installation processing module 220 can implement the received installation-related instructions from the central online expert system. For example, installation processing module 220 can execute instructions to decompress files received from installation server 130 or execute executable files received from installation server 130. Further embodiments of generic installer 120 can also include a status reporting module 230 that is configured to report to central online expert system 140 information related to the status of an install being performed by generic installer 120. Such status information can include log files and error-related information.

Application programming interface 210 is configured to receive and relay installation-related commands and information from and to central online expert system 140. As will be discussed in more detail below, in order to assist in determining appropriate software installation packages to provide to a remote node or to determine whether it is indeed appropriate to install a requested software product, the central online expert system can require information about the configuration of remote node 110. Application programming interface 210 can be configured to receive and convey those requests and instructions to installation processing module 220 or directly interface with the processor of remote node 110. Examples of commands that can be provided to API 210 include:

GET_REGISTRY_VALUE (KEY): requesting that the remote node provide a current value for a registry entry that is identified by the key;

PUT_REGISTRY_VALUE (KEY, VALUE): providing a value for a registry entry identified by key;

CREATE_REGISTRY_VALUE (KEY, VALUE): creating an entry in the remote node's registry as identified by the key and having a value provided by "value;"

DOWNLOAD (URL, TEMPFILE): instructing the remote node to download a file located at the specified URL;

EXECUTE (FILE): instructing the remote node to execute the identified file;

CHECKSUM (FILE): instructing the remote node to generate a checksum value for the identified file in order to determine that the file was properly transferred to the remote node;

EXTRACT (CABFILE, FILE, TEMPFILE): instructing the remote node to extract one or more files from a cabinet file (CABFILE) as a file or temporary file.

It should be noted that the above list of API commands is not intended to be exclusive and can be varied over time as additional functionality is added to the central online expert system. The generic installer is configured as a proxy for the central online expert system at the remote node and is therefore configured to flexibly implement changes made to the central online expert system. In addition, in response to each API command, the generic installer can return result information from the remote node to the central online expert system. Such information can inform the central online expert system of a successful completion of the command, failure of the command, or information responsive to queries or other analysis requested by the command.

Figure 3:
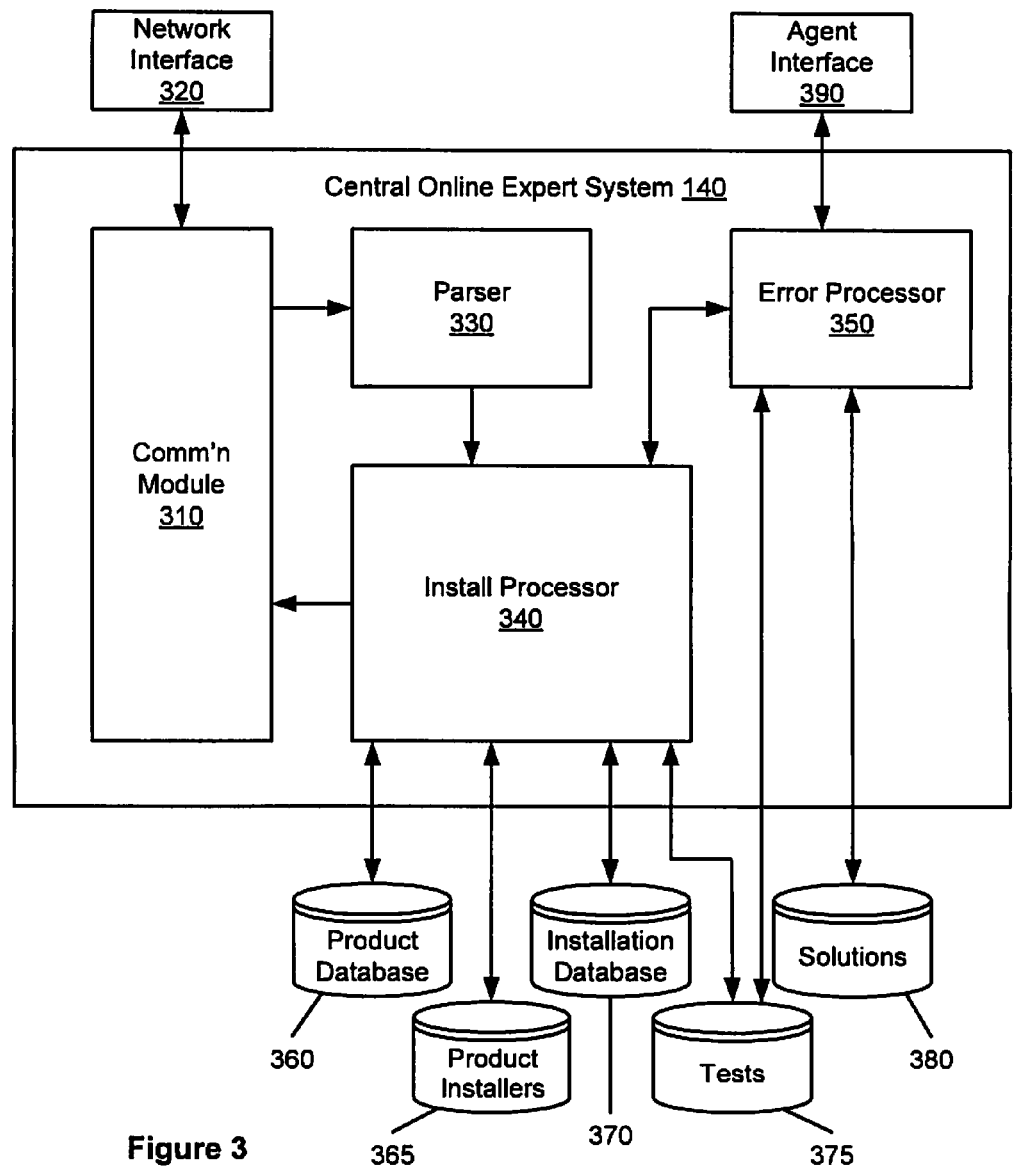
FIG. 3 is a simplified block diagram of a central online expert system 140, in accord with embodiments of the present invention.

FIG. 3 is a simplified block diagram of a central online expert system 140, in accord with embodiments of the present invention. As discussed above, the central online expert system performs tasks enabling installation of software on one or more remote nodes 110 using a generic installer 120 installed on the remote node as a proxy. As illustrated, embodiments of central online expert system 140 include a communications module 310 that receives information from remote nodes and provides information to remote nodes. Communication module 310 can be coupled to a network interface 320 that provides the physical connection to network 150. Communication module 310 provides received information to a parser 330. Parser 330 scans the received information in order to determine the nature of the received information (e.g., a request or status information) and provide that information to install processor 340. For example, parser 330 can determine a product name and version of the associated product as supplied by a remote node 110 and flag such information as a request-type communication before passing that information on to install processor 340. Alternatively, the functionality of parser 330 can be incorporated in install processor 340 and communication module 310 would communicate directly with install processor 340.

In embodiments of the present invention, install processor 340 performs the bulk of installation-related processing for remote nodes communicating with installation server 130. For example, upon receiving a request to install an identified software product, install processor 340 can query a product database 360 to determine the types of configuration information about the requesting remote node to request. Such configuration information is used to decide, for example, which version of the specified software product should be installed on the remote node or if the specified product can be installed on the remote node.

Product database 360 can contain, for example, entries for each available software item. Each entry can reference one or more templates describing information needed from a remote node in order to perform decision making as to the specified software product. Installation processor 340 can then use the information provided by the template to assemble one or more requests to query remote node 110 for the described information. Those requests can then be communicated to the remote node via communication module 310 to API 210 executing on the remote node. The requests, and the responses to those requests, can include identifying information related to the remote node performing the installation so that central online expert system 140 can properly track information related to a specific installation.

Once the central online expert system has received the requested information from the remote node, install processor 340 can then select an appropriate product installer for the selected product from a product installer database 365. Product installer database 365 can take the form of a storage volume containing product installers configured for each available product in light of, for example, operating system environment on which the product will be installed, or any other system-related variable queried by the central online expert system. Install processor 340 can then execute the retrieved product installer, performing tasks specified by the product installer. Such tasks can include, for example, providing compressed files or executable files to remote node 110, which can then be executed by generic installer 120.

During the course of executing the product installer, install processor 340 can record the progress of the product install in an installation database 370. Information can be recorded in the form of, for example, log files or database entries. Status information recorded in this manner will include an identifier of the remote node on which the installation is performed and an identifier of the product being installed in order to provide a means to track the installations.

Once an installation is completed, install processor 340 can access one or more tests for the installed software from a test database 375. Install processor 340 can supervise testing of the software through generic installer 120 and receive those results and record them in installation database 370.

During the course of installation and testing, install processor 340 can monitor the status of the installation in order to determine if an error has occurred in either the installation or subsequent testing. In the event of an error, install processor 340 can inform an error processor 350 of the error (e.g., via information received in response to API commands executed by the generic installer). Error processor 350 can then perform a review of the stored status information in installation database 370. From any error code and other information in the installation database, error processor 350 can attempt to determine the nature of the error and then determine if a solution to the error is available. Error processor 350 can determine if a solution is available by, for example, searching a solutions database 380 for any solutions related to the recorded failure-related information. Error processor 350 can collect sufficient information from installation database 370 to enable an efficient search of solutions database 380. Such information can include, for example, product name, product version, error code, and information from log files relative to the reported error code. If error processor 350 finds a solution to the reported problem, the error processor can provide that solution to install processor 340, which can then implement the solution through communication with generic installer 120 installed on remote node 110.

If, however, error processor 350 fails to discover a solution to the problem, the error processor can communicate with a technical support agent through an agent interface 390. Through the use of the agent interface, the technical support agent can examine the nature of an installation-related error and take control of the installation session. In one embodiment of the present invention, the technical support agent has available the same commands to issue to the remote node that the central online expert system can. Using such commands, the technical support agent can transmit queries to the remote node or provide a solution to the remote node through the same communication path utilized by install processor 340. In this manner, involvement of a technical support agent can be a seamless transition from a point of view of a user on remote node 110. In addition, a log can be maintained of the commands performed by the technical support agent, which can then be edited and added to solutions database 380 associated with the identified error.

Alternatively, should no solution be available in solutions database 380, error processor 350 can provide to a user on remote node 110 information on how to contact a technical support person or provide a source for additional information (e.g., a website URL). Embodiments of the present invention can include a database identifying a level of support paid for by a customer associated with the remote node. For example, a technical support agent can be contacted if the customer has paid for that level of support. If the customer has not, then they can just be provided with the URL for additional information or an option to purchase the services of a technical support agent for the current problem.

Figure 4:
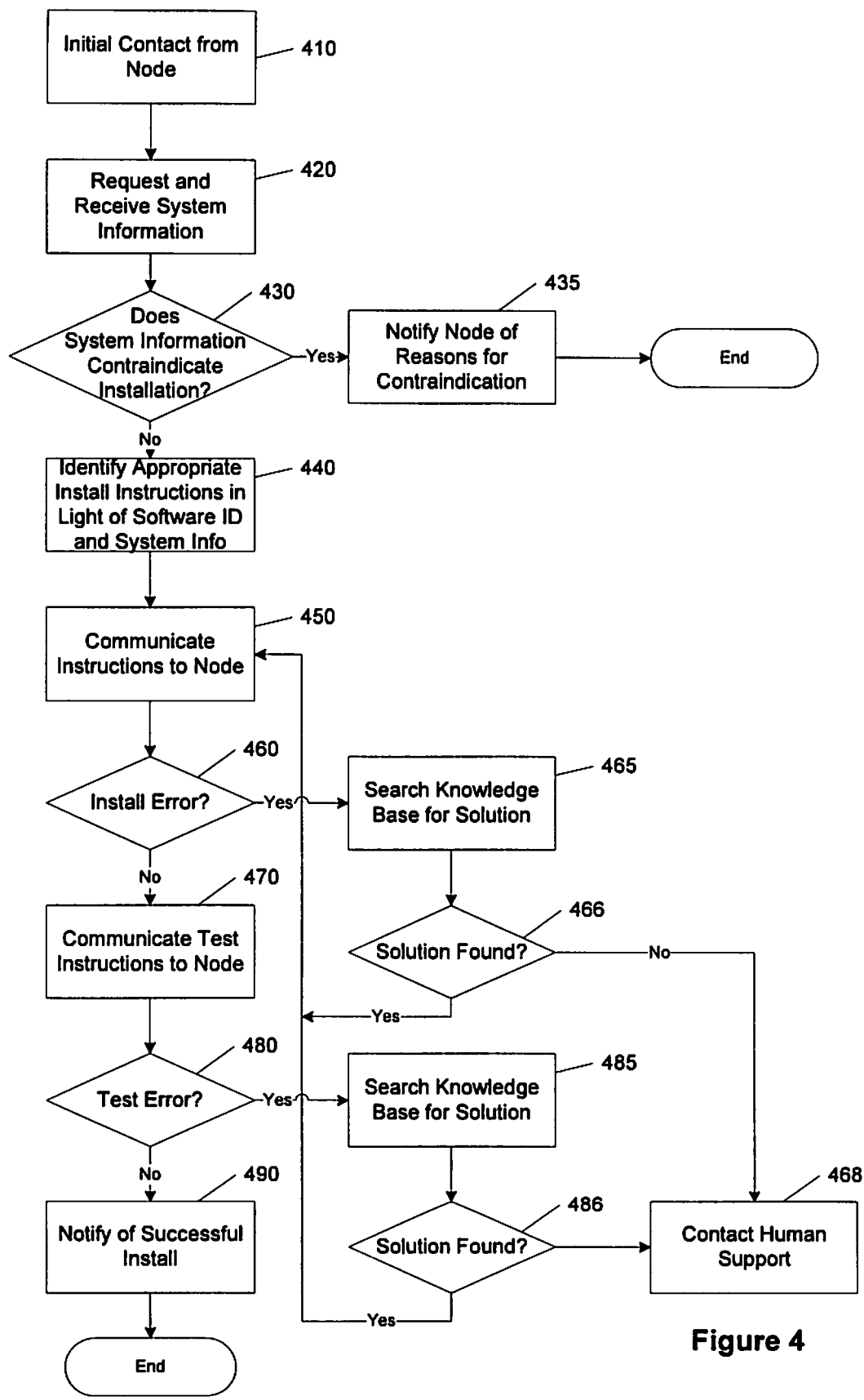
FIG. 4 is simplified flow diagram illustrating steps carried out by a central online expert system, in accord with embodiments of the present invention.

FIG. 4 is simplified flow diagram illustrating steps carried out by a central online expert system, in accord with embodiments of the present invention. An initial contact is received from a remote node 110 (410) that includes an identification of a selected software product for installation. Such an identification can include, for example, a name of the software product and a desired version of the software product. This initial contact from the remote node is initiated by a generic installer 120.

It should be noted that the generic installer can be introduced to the remote node in a variety of ways. For example, a customer can initiate an online purchase of the software product and upon the completion of the transaction for the purchase, the generic installer can be installed on the user's computer in order to perform the installation of the software product. Alternatively, a customer can purchase software on a computer-readable storage medium and the computer-readable storage medium can include the generic installer. In the scenario in which a user purchases computer-readable storage media, that computer-readable storage media can also include executable and compressed files related to the installation. How those files are utilized will be discussed further below.

Once the central online expert system receives the initial contact from the remote node, the software identification can be used to determine what additional system information regarding the remote node should be requested (420). As discussed above, one mechanism for making such a determination is to perform a search of a product database using the name and version of the selected software product as a key to identify an associated template file. The associated template file can include identification of the various pieces of system information required in order to make a determination as to whether the selected software product can be installed on the system and, if so, which product installer should be used to perform the installation. In one embodiment of the present invention, as discussed above, such system information is requested using API commands to the generic installer. In response, the generic installer provides the required information, which is received by the central online expert system. If the received system information contraindicates installation of the selected software product (430), then the central online expert system can notify the remote node of the reasons for the contraindication (435).

As stated above, the system information is used to identify the installation instructions for the system environment of the remote node (440). Embodiments of the present invention can, for example, maintain sets of flow charts of instructions for the central online expert system to follow for various system environment scenarios. Such instructions can include downloading files to the remote node, copying files, providing cabinet-type compressed files to the remote node, uncompressing files from a cabinet file, reading and writing registry values, and launching executables on the remote node. Installation instructions are executed by the central online expert system and implemented on the remote node through the use of an application programming interface that is part of the generic installer 120 (450). For example, the flow chart of instructions is followed based upon results received from the back-and-forth communication between generic installer 120 and central online expert system 140 and continues until the installation is completed or an error occurs that terminates the installation. During this period of executing the installation instructions, the central online expert system maintains log files and other data related to the installation. If an error occurs during the course of the product installation (460), then a knowledge base can be searched for a solution to the problem (465). If a solution is found (466), then instructions related to the solution can be executed and implemented on the remote node (450). If no solution is found to the installation error, then a technical support agent can be contacted to provide guidance (468). If no error occurred during the installation (460), then test instructions can be communicated to the generic installer 120. As discussed above, test instructions can be provided by a search of a test database and executed and implemented on the remote node. If no error occurs during the testing of the software installation (480), then the remote node can be notified of a successful installation (490). If an error occurs during the testing phase, then the knowledge base can be searched for a solution to the test error (485). If a solution is found to the test error (486), then the solution can be executed by the central online expert system and implemented on the remote node (450). Such a solution can include a reinstallation of all or part of the product. Subsequent to the reinstallation, additional testing can occur as discussed above. In addition, if no solution to the test error is found (486), then a technical support agent can be contacted to provide assistance (468). Alternatively, step 468 can make a determination if a customer associated with the remote node has paid for a level of support providing a technical support agent. If so, then the agent can be contacted. If not, then a reference to a support site can be provided to the remote node or an option to purchase technical support for this problem can be provided.

In the instances where a customer has purchased computer-readable storage media that includes a software distribution, the central online expert system can determine whether the images on the computer-readable storage media are the most recent images available for the software installation. If the images on the computer-readable storage media are the most recent, then the central online expert system can instruct the generic installer to utilize those images during the course of the software installation. Alternatively, if the images on the computer-readable storage media are not the most recent, then the central online expert system can provide images from the product installer database, as discussed above.

Through use of the above-described system, software installation is provided from a centrally-managed source. Further, software installation related errors are addressed during the course of installation, thereby seamlessly providing a clean install for the remote node user. In addition, support from a technical support agent is automatically provided in the event that no readily identifiable fixes are found.

An Example Computing and Network Environment

As shown above, the present invention can be implemented using a variety of computer systems and networks. An example of one such computing and network environment is described below with reference to FIGS. 5 and 6.

Figure 5:
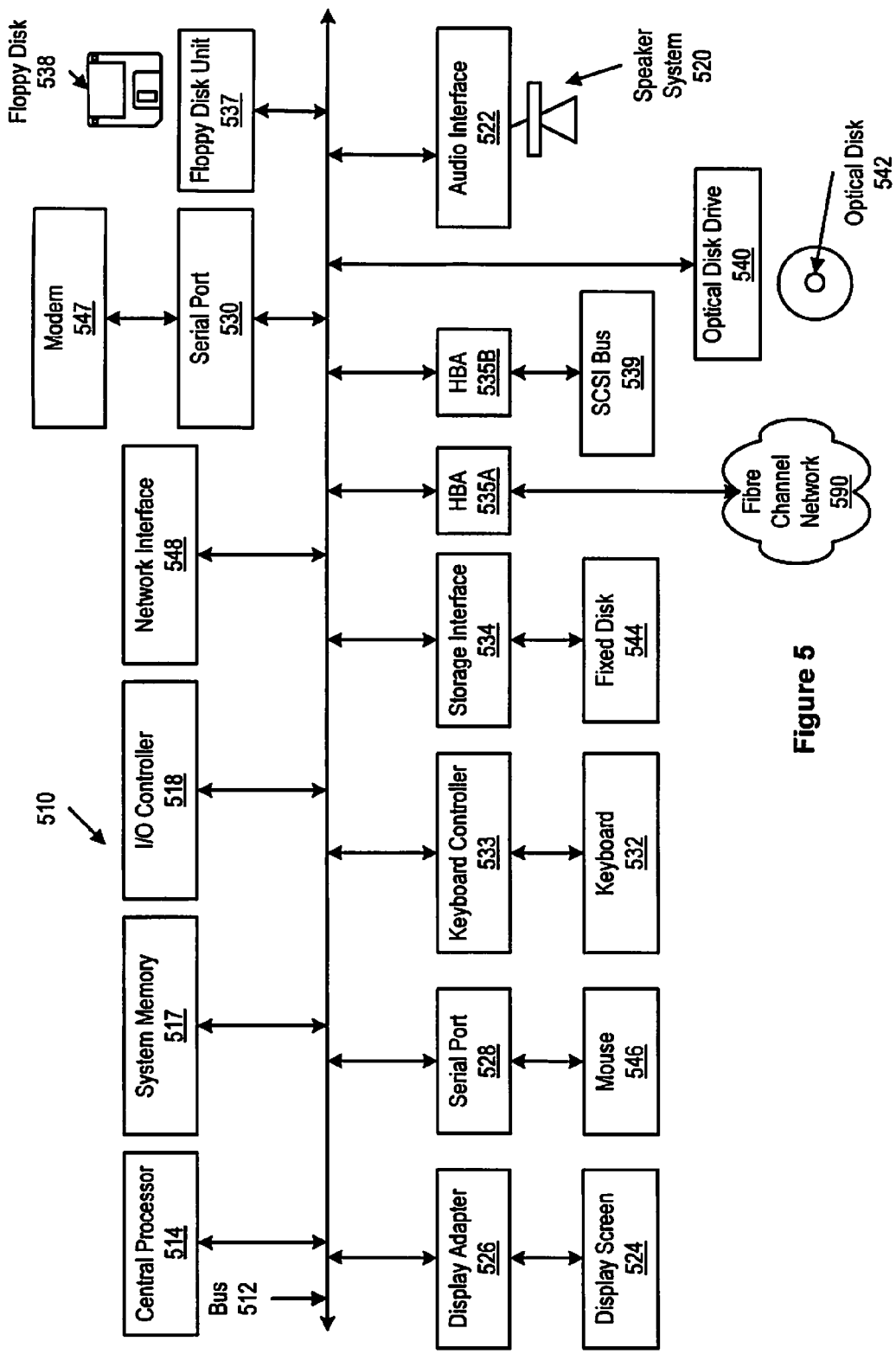
FIG. 5 depicts a block diagram of a computer system suitable for implementing embodiments of the present invention.

FIG. 5 depicts a block diagram of a computer system 510 suitable for implementing the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer-readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
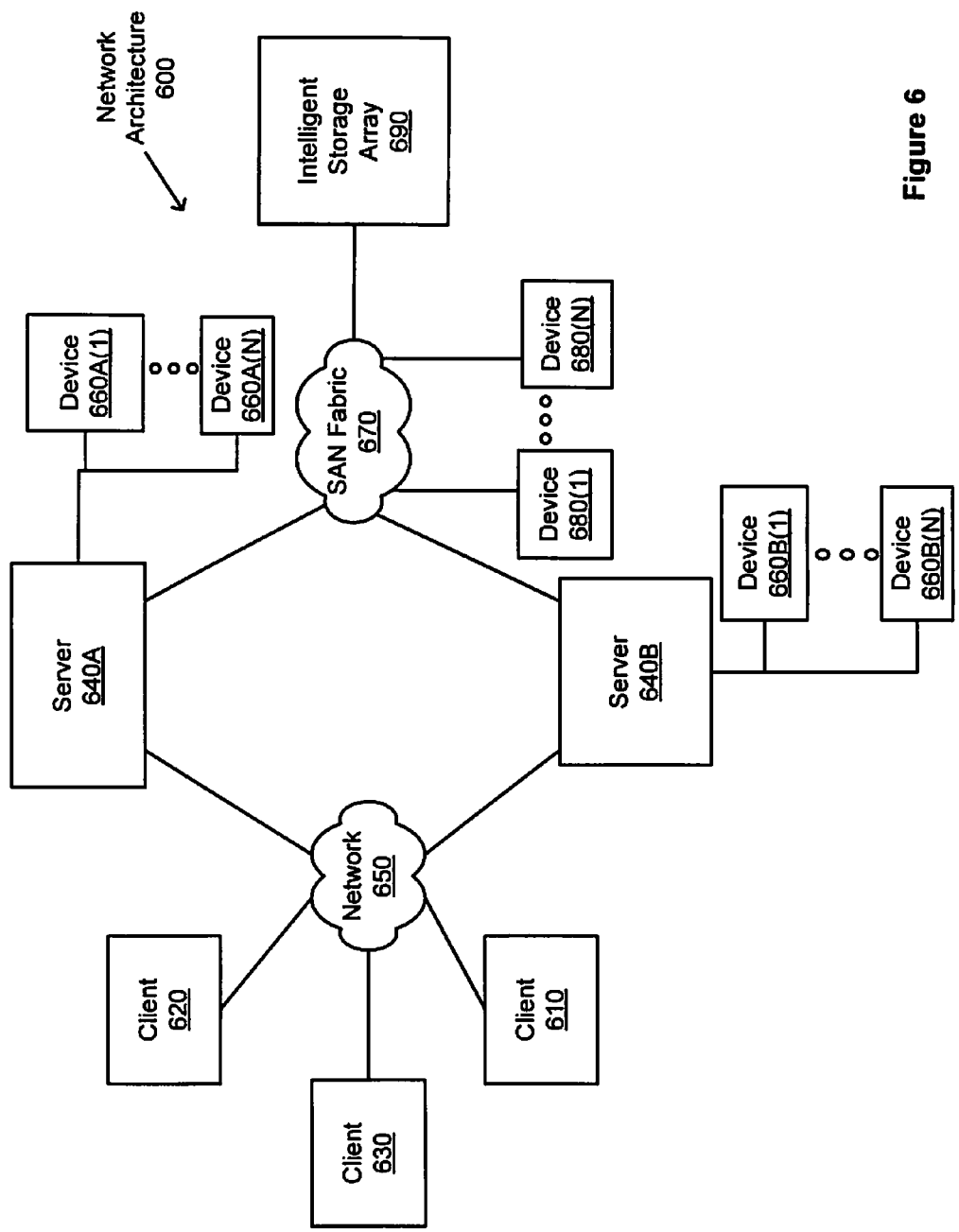
FIG. 6 is a block diagram depicting a network architecture suitable for implementing embodiments of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   identifying, in response to a request, installation instructions configured to install a product on a remote node, wherein
      the identifying is performed by an installation server, and
      the installation server is configured to receive the request from an installer program executed by the remote node;
   communicating, to the installer program, installation information regarding the installation instructions, wherein the communicating is performed over a network;
   monitoring an installation, wherein
      the installation comprises executing the installation instructions,
      the installer program causes the installation instructions to be performed by the remote node,
      the executing the installation instructions is based, at least in part, on the installation information,
      the monitoring is performed by the installation server, and
      the monitoring is performed by analyzing status information received from the remote node;
   recording results of the installation;
   if an error associated with the installation is detected in the results,
      determining whether a solution to the error is available by submitting the results for analysis, wherein
         the determining whether the solution to the error is available is performed by the installation server, and
         the determining whether the solution to the error is available is based, at least in part, on the installation information, and
      if the solution to the error is available, communicating solution-related information to the remote node over the network, wherein
         the solution-related information describes information regarding the solution to the error;
   if no error associated with the installation is detected in the results,
      communicating one or more test instructions to the remote node, wherein the test instructions are configured to be executed by the remote node;
   receiving one or more test results from the remote node, wherein
      the one or more test results indicate execution status of a test, wherein
         the test comprises execution of the test instructions; and
   if a testing error associated with the test is detected in the one or more test results,
      determining whether a solution to the testing error is available by submitting the one or more test results for a test analysis, wherein
         the determining whether the solution to the error is available is based, at least in part, on the one or more test results, and
      if the solution to the testing error is available, communicating other solution-related information to the remote node over the network, wherein
         the other solution-related information describes other information regarding the solution to the testing error.

2. The method of claim 1, further comprising:
   receiving an identification of the product from the remote node, wherein
      the receiving the identification is performed prior to the identifying the installation instructions; and
   requesting configuration information about a configuration of the remote node, in response to the receiving the identification of the product.

3. The method of claim 2, wherein the identifying the installation instructions is performed using the identification of the product and the configuration information.

4. The method of claim 3, wherein the identifying the installation instructions comprises:
   searching a database of installation instructions, wherein the database of installation instructions comprises entries having fields for the identification of the product, the configuration information, and a corresponding location of the installation instructions.

5. The method of claim 2, further comprising:
   identifying the configuration information to request using the identification of the product, wherein the identification of the product has a corresponding set of configuration information.

6. The method of claim 5, wherein
   the configuration information comprises one or more of an operating system type, an operating system version, identification of disks available, free disk space available on the identified disks, products currently installed, or hardware configuration.

7. The method of claim 2, wherein the requesting the configuration information comprises:
   communicating a second request to an application programming interface (API) installed on the remote node.

8. The method of claim 1, wherein the communicating the installation information regarding the installation instructions to the remote node comprises:
   communicating with an application programming interface (API) installed on the remote node.

9. The method of claim 8, wherein the installation information comprises one or more of:
   downloaded files, copied files, compressed files for extracting, registry values for creation or modification, or executable files for launching.

10. The method of claim 1, wherein the submitting the results for analysis comprises:
    searching a set of solutions associated with corresponding criteria associated with installation-related failures associated with the product for a match to the results associated with an installation-related failure, wherein the searching is based, at least in part, on the installation information;
    providing a solution associated with the match, if the match is found; and
    providing identification information to a source of support for the product, if the match is not found.

11. The method of claim 10, wherein the submitting the results for analysis further comprises:
    communicating with an agent, if the match is not found, wherein
       the agent is requested to provide a solution to the installation-related failure.

12. An apparatus comprising:
    a processor; and
    a first memory, coupled to the processor, and storing instructions executable by the processor, the instructions configured to
       identify, in response to a request, installation instructions configured to install a product on a remote node, wherein
          the first memory is configured to receive the request from an installer program executed by the remote node;
       communicate, to the installer program, installation information regarding the installation instructions, wherein
          the installation information is configured to be communicated to the remote node over a network;
       monitor an installation, wherein
          the installation comprises execution of the installation instructions,
          the installer program causes the installation instructions to be executed by the remote node,
          the execution of the installation instructions is based, at least in part, on the installation information, and
          the installation is monitored by analyzing status information received from the remote node;
       record results of the installation;
       if an error associated with the installation is detected in the results,
          make a determination whether a solution to the error is available by submitting the results for analysis, wherein
             the determination whether the solution to the error is available is based, at least in part, on the installation information, and
          if the solution to the error is available, communicate solution-related information to the remote node over the network, wherein
             the solution-related information describes information regarding the solution to the error;
       if no error associated with the installation is detected in the results,
          communicate one or more test instructions to the remote node,
             wherein the test instructions are configured to be executed by the remote node;
          receive one or more test results from the remote node, wherein
             the one or more test results indicate execution status of a test, wherein
                the test comprises execution of the test instructions; and
          if a testing error associated with the test is detected in the one or more test results,
             make a determination whether a solution to the testing error is available by submitting the one or more test results for a test analysis, wherein
                the determination whether the solution to the testing error is available is based, at least in part, on the one or more test results, and
             if the solution to the testing error is available, communicate other solution-related information to the remote node over the network, wherein
                the other solution-related information is configured to describe other information regarding the solution to the testing error.

13. The apparatus of claim 12, further comprising instructions configured to:
    receive an identification of the product from the remote node, wherein
       the identification of the product is received prior to identification of the installation instructions; and
    request configuration information about a configuration of the remote node, in response to the receipt of the identification of the product.

14. The apparatus of claim 13, wherein the instructions to identify the installation instructions are configured to use the identification of the product and the configuration information.

15. The apparatus of claim 13, further comprising instructions configured to:
  identify the configuration information to request using the identification of the product, wherein
    the identification of the product has a corresponding set of configuration information.
16. The apparatus of claim 12, wherein the instructions to communicate the installation information regarding the installation instructions to the remote node further comprise instructions configured to:
  communicate with an application programming interface (API) installed on the remote node.
17. The apparatus of claim 12, wherein the instructions to submit the results for analysis further comprises instructions configured to:
  search a set of solutions associated with corresponding criteria associated with installation-related failures associated with the product for a match to the results associated with an installation-related failure, wherein
    the search is based, at least in part, on the installation information;
  provide a solution associated with the match, if the match is found; and
  provide identification information to a source of support for the product, if the match is not found.
18. A non-transitory computer-readable storage medium comprising:
  a first set of instructions, executable by a processor, configured to identify, in response to a request, installation instructions configured to install a product on a remote node, wherein
    the first set of instructions is configured to receive the request from an installer program executed by the remote node;
  a second set of instructions, executable by the processor, configured to communicate, to the installer program, installation information regarding the installation instructions, wherein
    the installation information is configured to be communicated to the remote node over a network;
  a third set of instructions, executable by the processor, configured to monitor an installation, wherein
    the installation comprises an execution of the installation instructions,
    the installer program causes the installation instructions to be executed by the remote node,
    the execution of the installation instructions is based, at least in part, on the installation information, and
    the installation is monitored by analyzing status information received from the remote node;
  a fourth set of instructions, executable by the processor, configured to record results of the installation;
  a fifth set of instructions, executable by the processor, configured to detect an error associated with the installation in the results, and further configured to
    make a determination whether a solution to the error is available by submitting the results for analysis, wherein
      the determination whether a solution to the error is available is based, at least in part, on the installation information, and
    if the solution to the error is available, communicate solution-related information to the remote node over the network, wherein
      the solution-related information describes information regarding the solution to the error; and
  a sixth set of instructions, executable by the processor, configured to detect that no error associated with the installation is in the results, and further configured to
    communicate one or more test instructions to the remote node, wherein the test instructions are configured to be executed by the remote node;
  a seventh set of instructions, executable by the processor, configured to receive one or more test results from the remote node, wherein
    the one or more test results indicate execution status of a test, wherein
      the test comprises execution of the test instructions; and
  an eighth set of instructions, executable by the processor, configured to detect that a testing error associated with the test is in the one or more test results, and further configured to
    make a determination whether a solution to the testing error is available by submitting the one or more test results for a test analysis, wherein
      the determination whether the solution to the testing error is available is based, at least in part, on the one or more test results, and
      if the solution to the testing error is available, communicate other solution-related information to the remote node over the network, wherein
        the other solution-related information is configured to describe other information regarding the solution to the testing error.
19. The non-transitory computer-readable storage medium of claim 18, further comprising:
  a ninth set of instructions, executable by the processor, configured to receive an identification of the product from the remote node, wherein
    the identification of the product is received prior to identification of the installation instructions; and
  a tenth set of instructions, executable by the processor, configured to request configuration information about a configuration of the remote node, in response to the receipt of the identification of the product.
20. The non-transitory computer-readable storage medium of claim 19, wherein
  the first set of instructions are further configured to use the identification of the product and the configuration information.
21. The method of claim 1, further comprising:
  determining the one or more test instructions based, at least in part, on the installation information.
22. The method of claim 21, wherein
  if a testing error associated with the execution of the test is not detected in the one or more test results,
    communicating an indication of a successful installation to the remote node.
23. The method of claim 22,
  if a testing error associated with the execution of the test is detected in the one or more test results,
    the determining whether the solution to the testing error is available is performed by the installation server.
24. The method of claim 1, wherein
  the installer program is configured to
    execute the installation instructions.

* * * * *

UNITED STATES PATENT AND TRADEMARK OFFICE
CERTIFICATE OF CORRECTION

| | | |
|---|---|---|
| PATENT NO. | : 9,058,230 B1 | Page 1 of 1 |
| APPLICATION NO. | : 12/127373 | |
| DATED | : June 16, 2015 | |
| INVENTOR(S) | : van Rietschote et al. | |

It is certified that error appears in the above-identified patent and that said Letters Patent is hereby corrected as shown below:

In the claims
Column 12
Line 48, Claim 1, delete "the error" insert -- the testing error --

Signed and Sealed this
Third Day of May, 2016

Michelle K. Lee
*Director of the United States Patent and Trademark Office*